United States Patent [19]

Fish

[11] 4,149,412
[45] Apr. 17, 1979

[54] LEVEL MEASURING APPARATUS

[76] Inventor: Bobby L. Fish, 1549 Shirley, Pleasant Hill, Calif. 94523

[21] Appl. No.: 916,268

[22] Filed: Jun. 16, 1978

[51] Int. Cl.$^2$ ............................................. G01F 23/26
[52] U.S. Cl. .................................. 73/304 C; 73/1 H; 340/612
[58] Field of Search ...................... 73/304 C, 1 H, 307; 340/612, 618; 324/60 CD; 307/118

[56] References Cited

U.S. PATENT DOCUMENTS

| | | | |
|---|---|---|---|
| Re. 27,829 | 12/1973 | Tiffany | 73/304 C |
| 3,533,286 | 10/1970 | Westcott et al. | 73/304 C |
| 3,916,689 | 11/1975 | Donnelly | 73/304 C |
| 4,058,765 | 11/1977 | Richardson et al. | 73/304 C |

*Primary Examiner*—Anthony V. Ciarlante
*Attorney, Agent, or Firm*—Phillips, Moore, Weissenberger, Lempio & Majestic

[57] ABSTRACT

An apparatus for measuring the level of material in a container includes a timer which responds to the change in the capacitance of a probe as the level of the material varies with respect thereto. An oscillator periodically strobes said timer, which thereafter remains on for a length of time determined by said probe capacitance. A meter indicates this timer on-time, thereby providing a measure of the detected probe capaictance, and thus the level of material. The on-time of said oscillator is also variable, the output thereof being coupled to said meter to hold said meter off for a time equal to the time said timer is caused to be on due to the residual capacitance of the probe existing even when no material is present. One or more flag timers are also provided, including the ability to adjust the on-time of each said flag timer to provide an indication of a critical level or of a level above or below such level.

7 Claims, 3 Drawing Figures

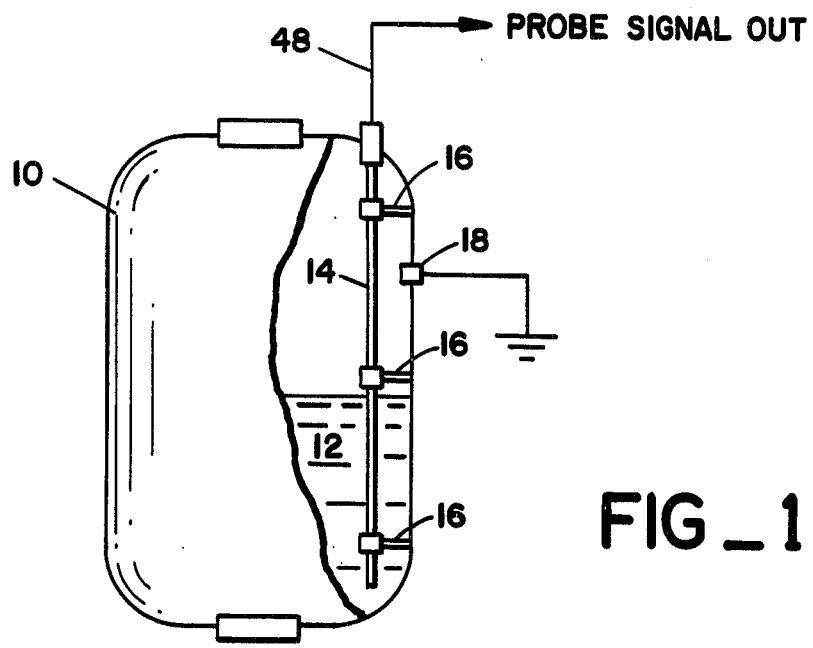
FIG_1
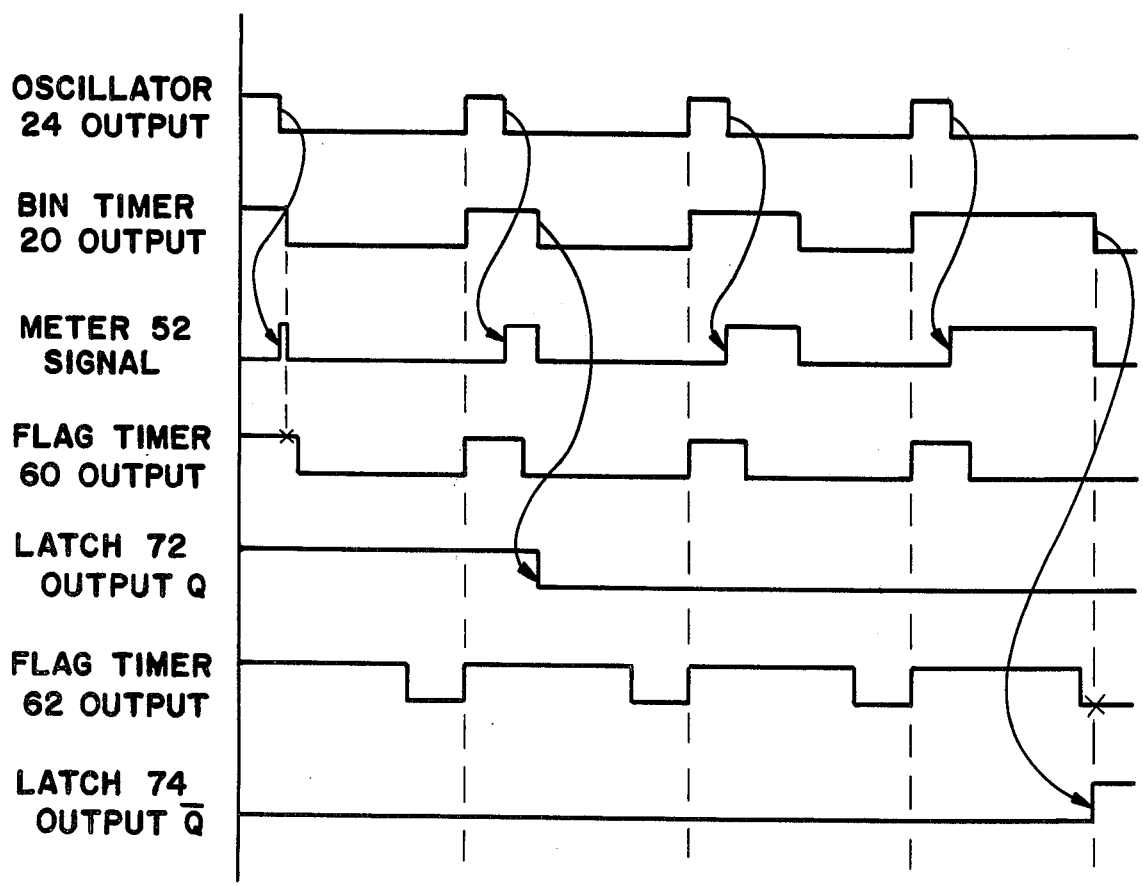
FIG_3

LEVEL MEASURING APPARATUS

BACKGROUND OF THE INVENTION

Measuring of the volume or level of material in a container is reasonably well known in the art. See e.g. U.S. Pat. No. 2,946,991 to Lindenberg and U.S. Pat. No. Re 27,829 to Tiffany. However, none of these prior art level or volume measuring devices includes means for adjustably presetting the apparatus to negate the effects of residual capacitance in the probe. Such residual capacitance effects will cause a measurable indication on a meter or other indicator even when no material is presently in the container if not compensated for by operation of the circuitry. Further, an indication of a critical level or volume is also desirous, with such level indicating means being also adjustable depending on the result desired. The Patent to Hile et al, U.S. Pat. No. 4,001,676 discloses a level warning detector, but does not include means for simply and easily enabling the adjustment of said means.

SUMMARY OF THE INVENTION

The present invention relates to an apparatus for the remote indication of the level or volume of a material in a container, such as a bin or silo. In the present invention, a probe is designed to be mounted vertically in the container wherein the level of material is to be measured. As the level of the material in the container rises, and covers an increasingly larger portion of the probe, the capacitance of the probe is gradually altered, due to the change in the dielectric constant between the probe and the metal wall of the container. An oscillator periodically strobes a first timer which is operatively connected to the probe, such that the on-time of said timer is a function of the present capacitance of the probe as determined by the level of the material in the container. The output of the first timer is coupled to a level indicator means.

The level indicated by said indicator means is adjustable by means of said oscillator. The oscillator holds off the indicator means during its on-time. This on-time is preset such that it equals the on-time of the first timer when no material is in the container. This eliminates any residual capacitance existing in the probe, or in the wiring between the probe and said first timer. The oscillator on-time is adjustable to eliminate the need to change components when a different container is being measured by the present invention, or when the probe is replaced, etc. Also included are one or more flag timers which may be adjustably set to indicate when the level in the container being measured has reached some desired or critical point. As such time, a latch is set amd a flag indicator means is activated.

Therefore, a principal object of the present invention is to provide an apparatus for measuring the level of material in a container, wherein the apparatus may be preset such that the residual capacitance in the probe can be eliminated as an effect on the level indicator means.

A further object of the present invention is to provide an apparatus for measuring the level of material in a container, wherein an indication of specific desired or critical levels of material in said container can be preset, thereby providing either a warning, control signal, or other response, as desired, for the given application thereof.

These and other objects and advantages of the present invention will become more apparent upon reference to the accompanying drawings and the following description.

BRIEF DESCRIPTION OF THE DRAWINGS

FIG. 1 illustrates a preferred means for mounting a probe in a container according to the present invention;

FIG. 3 illustrates a timing diagram showing the operation of the present invention.

DESCRIPTION OF A PREFERRED EMBODIMENT

Figure 2:
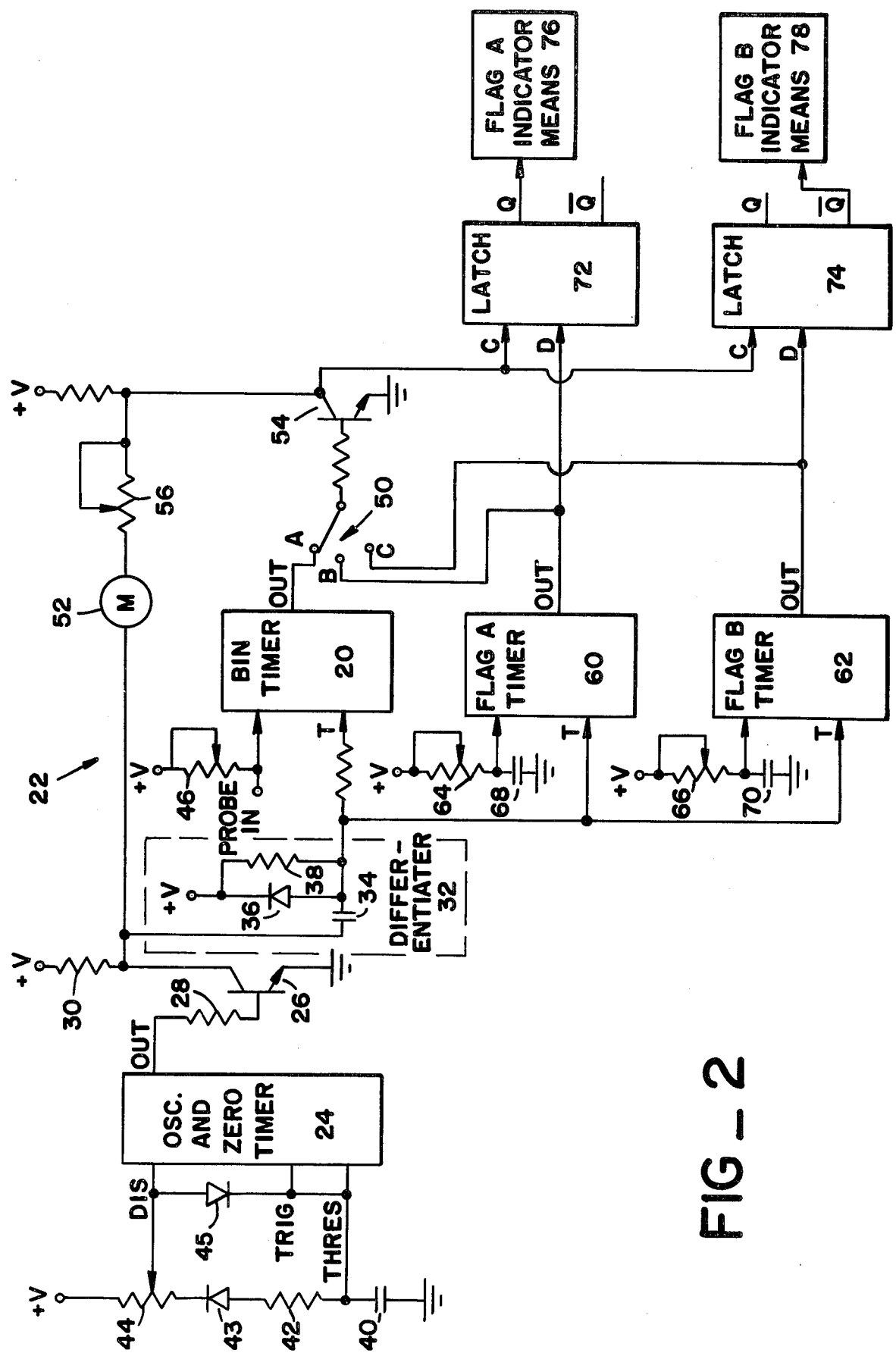
FIG. 2 illustrates a schematic circuit diagram, partly in functional block diagram form, of the timing circuitry of the present invention.

In FIG. 1, a container, such as a storage bin, silo or the like is shown at 10. The container 10 is designed to hold various amounts of material 12 therein. A metallic probe 14 is supported within container 10 in a vertical orientation by means of insulated struts 16. In the present embodiment, the container 10 is assumed to be a metallic container, so that the probe 14 measures the capacitance between probe 14 and the wall of the container, which is referenced to ground, as shown at 18. Note that if the container 10 is nonmetallic, a separate grounded plate would be positioned along the container 10 wall opposite said probe 14, to provide this function. If the material to be measured is conductive, either the plate must again be insulated, or the probe 14 must be insulated, in order to prevent contact with such conductive material. Note that when the level of an electrically conductive material is being measured, the insulating material is the dielectric. In this case, the measured capacitive variation, as a function of material level, would result from the change in effective surface area occurring between the probe 14 and container 10 resulting from material 12 contact therewith.

As can be seen in FIG. 1, as the level of material 12 in the container 10 is caused to increase, the material fills in the gap between the probe 14 and the container wall 10. The dielectric constant of the material 12 thereby modifies the electric field between the probe 14 and container wall 10 such that the capacitance thereof is caused to vary.

FIG. 2 illustrates an embodiment 22 of the circuit according to the present invention. As can be seen in FIG. 2, the output of probe 14 is fed into a bin timer 20, comprising a first timer means. Bin timer 20 is strobed by means of an oscillator and zero timer 24. The output of oscillator 24 is fed through an inverting buffer comprising transistor 26 and resistors 28 and 30 and thereafter through a differentiator 32, comprising capacitor 34, diode 36 and resistor 38 connected in a conventional manner, such that the output to bin timer 20 therefrom is a spike pulse. Thus, when the output of oscillator 24 goes high, a negative going spike is caused to be generated via differentiator 32 which thereby causes bin timer 20 to go on. Note that all timers used in the present invention, including bin timer 20 and oscillator 24 comprise timing circuit RS555,556 timers, which are commonly available integrated circuits produced by various manufacturers. See e.g. Radio Shack Technical Data Sheet No. 990-0394, the contents of which are hereby incorporated herein.

Oscillator and zero timer 24 is connected up as an astable multivibrator, wherein external capacitor 40 is caused to discharge through resistors 42 and 44 and charge just through resistor 44. This is enabled by means of diodes 43 and 45 which function to separate the charging and discharging paths of capacitor 40. Thus, the duty cycle of oscillator 24 may be precisely set by the ratio of these two resistors. That is, the on-time as well as the frequency of the output pulses from oscillator 24 can be selectively varied. In the present embodiment, resistor 44 is a variable resistor connected up in such a way that this duty cycle can be easily adjusted as desired.

The bin timer 20 is connected as a monostable multivibrator, or one shot, wherein resistor 46 and the capacitance of probe 14 are used by timer 20 to generate an output signal having an on-time which is a function thereof. Variation of the capacitance in probe 14 causes a corresponding variation in this on-time. Similarly, the resistor 46 is variable, so that the maximum on-time of the bin timer 20 output is adjustable. The output on-time should never be longer than the frequency of the output signals from said oscillator 24. Note also that besides the component of capacitance generated by the gap between probe 14 and the wall of container 10, the wiring 48 from the probe to the bin timer 20 also adds some capacitance. Normally such wiring could contribute approximately 50 picofarads per foot. As will be described below, means are provided for negating the effect of this residual capacitance.

The output of bin timer 20 is fed through a switch means 50 to a conventional meter 52 for providing means for indicating the present level of material 12 in container 10. In the present embodiment, meter 52 is a conventional ammeter which indicates the amount of current flowing therethrough. One side of meter 52 is tied to the bin timer 20 via an inverting transistor 54. The opposite side of meter 52 is fed from the inverted output of oscillator 24. Consequently, only when the oscillator 24 is off and bin timer 20 is on will current flow through meter 52. The longer bin timer 20 is on, the more current will flow through meter 52, consequently generating a higher reading. The more the probe 14 is covered by material 12, the larger the capacitance detected by bin timer 20, and thus the longer bin timer 20 will remain on. Thus, as container 10 fills up with material 12, the meter 52 is caused to have a higher reading.

As also can be seen from the above arrangement, so long as oscillator 24 is on, no reading is allowed to be output on meter 52. Consequently, this provides means responsive to the present state of oscillator 24 for holding off meter 52, said indicator means, during the oscillator 24 on-time. Resistor 44 thus comprises means for presetting the on-time of said oscillator means. As a result, oscillator 24 on-time can be adjusted to equal the effect of the residual capacitance of probe 14 on bin timer 20. Thus, meter 52 only provides an indication of capacitance for the capacitance that is detected beyond the initially calibrated residual capacitance of the system.

Variable resistor 56 is provided merely to enable adjustment of the current in the meter 52 during the initial calibration of the apparatus of the present invention.

The circuit 22 of the present invention also includes one or more flag timers, including flag A timer 60 and flag B timer 62. The trigger inputs of these two timers also is fed from the spike output of differentiator 32, as generated from the output of oscillator 24. These timers 60 and 62 are identical to the bin timer 20, except that the on-time of timers 60 and 62 is adjusted by respective variable resistors 64 and 66, with the capacitors associated therewith, capacitors 68 and 70 remaining constant. Resistors 64 and 66 thus provide means for presetting the on-time of these timers 60, 62.

The outputs of timers 60 and 62 are fed to separate terminals of switch means 50. When a timer 60, 62 on-time is to be adjusted, switch means 50 manually selectively causes the bin timer 20 output to be disconnected from the meter 52 circuit, and the respective selected timer 60, 62 output connected in its place. The meter 52 will now indicate the material level as set by the on-time of this timer. Then by adjusting the respective resistor 64 or 66, the new on-time representing a new specific level of material 12 in container 10 will be preset into said timer. When the presetting operation has been completed for each timer 60, 62, switch means 50 is returned to its original position, to enable the normal indication of bin timer on-time on meter 52 to resume.

The outputs of timers 60 and 62 are also fed into respective latches 72 and 74. The clock input to these latches 72, 74 is fed from the inverted output of bin timer 20. Thus, when the timer 20 times out and goes off a rising edge is detected by these latches, thereby causing the present state of the D inputs thereto to be latched in and coupled out of the latches on their Q output lines. The output from each of the latches 72, 74 is coupled to respective flag indicator means 76, 78 which are responsive to the state of said latches, for indicating their present state. Examples of flag indicator means would be a warning buzzer or light, a control signal, or some other indicated response, as desired.

As can be seen, latches 72 or 74 may be alternatively adjusted so that they generate an output signal on the $\bar{Q}$ line, thereby outputting a signal when a signal from the associated timers 60, 62 is not present. As a result, one indicator means 76, 78 may be set up to give a flag condition whenever the bin timer 20 stays on longer than a respective timer 60, 62, whereas the other indicator means may be set up to give a flag condition whenever the bin timer 20 goes off before its respective timer 60, 62.

FIG. 3 is a timing diagram illustrating the operation of the above described timers according to the present invention. The first curve illustrates the signal output by oscillator 24. The next shows the output of the bin timer 20, with an increasing capacitance being detected from probe 14. As can be seen, the bin timer 20 goes on essentially just after the oscillator 24 goes on. The signal which actuates meter 52 is shown. The pulse width of this signal is equal to the on-time of timer 20 less the on-time of oscillator 24. In other words, the meter 52 is enabled to indicate a signal only after oscillator 24 goes off and only so long as timer 20 remains on thereafter. Note that the pulse width of timer 20 is shown to increase each time it is strobed by oscillator 24 only to illustrate how these different pulse widths affect meter 52 and flag timers 60, 62. In normal operation, oscillator 24 has a pulse rate much greater than the expected rate of change in the detected capacitance from probe 14. The oscillator 24 pulse would typically be generated many times per second. Thus, the pulse width of adjacent pulses to meter 52 stays substantially equal, with meter 52 integrating the on-time of such pulses in a conventional manner such that a constant level is indicated thereon.

Also shown in FIG. 3 is the output of the two flag timers 60 and 62, and an illustration of the operation of latches 72 and 74 when the duration of the on-time of bin timer 20 is either equal to and/or exceeds a specific time, or equal to and/or is less than a specific time. Both flag timer 60 and 62 are strobed on, in the same way as timer 20, by oscillator 24. Both latch 72 and 74 are clocked by the output of timer 20 when timer 20 goes off. The state of each flag timer at this instant is loaded into and stored in its respective latch 72, 74. The Q output of latch 72 will go high or remain high, for example, when the bin timer 20 pulse goes low and clocks latch 72 before flag timer 60 has turned off and gone low. Similarly, the $\overline{Q}$ output of latch 74 goes high or remains high if flag timer 62 has turned off before the bin timer 20 pulse has gone low.

It is to be understood that the foregoing description is merely illustrative of a preferred embodiment of the invention, and the scope of the invention is not to be limited thereto, but is to be determined by the scope of the appended claims.

I claim:

1. An apparatus for measuring the level of material in a container comprising:
   probe means;
   level indicator means;
   first timer means operatively connected to said probe means such that the on-time of said timer, when it is strobed, is a function of the capacitance of said probe means;
   means for coupling the output of said first timer means to said level indicator means;
   oscillator means for periodically strobing said first timer means, said oscillator means including means for presetting the on-time of said oscillator means such that said oscillator means remains on for a length of time equal to the time said first timer means remains on due to the residual capacitance in said probe means;
   means for adjusting said presetting means; and
   means responsive to said oscillator means for holding off said indicator means during the on-time of said oscillator means.

2. The apparatus of claim 1 further comprising:
   flag timer means having a specific on-time when strobed, said oscillator means being caused to strobe said flag timer means at substantially the same time as said first timer means;
   latch means;
   flag indicator means responsive to the present state of said latch means; and
   means for adjusting the on-time of said flag timer means such that said on-time represents a specific desired level of said level indicator means, said latch means responsive to said first timer means to change state when the on-time of said first timer equals or is greater than the on-time of said flag timer means.

3. The apparatus of claim 1 further comprising:
   flag timer means having a specific on-time when strobed, said oscillator means being caused to strobe said flag timer means at substantially the same time as said first timer means;
   latch means;
   flag indicator means responsive to the present state of said latch means; and
   means for adjusting the on-time of said flag timer means such that said on-time represents a specific desired level on said level indicator means, said latch means responsive to said first timer means to change state when the on-time of said first timer equals or is less than the on-time of said flag timer means.

4. The apparatus of claim 2 or 3 wherein said means for adjusting the on-time of said flag timer means includes:
   means for switchably coupling the output of said flag timer means to said level indicator means and for disabling the coupling of said first timer means to said level indicator means, such that the on-time of said flag timer means is thereby represented on said indicator means as a specific level of material in said container.

5. The apparatus of claim 1 further comprising:
   a plurality of flag timers, each such timer having operatively connected therewith:
   i) latch means; and
   ii) flag indicator means responsive to the present state of said latch means;
   means for adjusting the on-time of each said flag timer means such that each said on-time represents a specific level of material on said level indicator means; and
   means in each said latch means responsive to the state of said first timer means, for changing state when the on-time of said first timer means is in a specific predetermined condition with respect to the on-time of said flag timer means.

6. A method for measuring the level of material in a container and for detecting when a selected level of material has been reached comprising the steps of:
   (a) positioning a probe in a vertical orientation in said container and defined in a spaced relationship with respect to a wall thereof;
   (b) strobing a first timer means periodically such that it turns on at this time;
   (c) causing said first timer means to remain on a specific length of time as a function of the capacitance of said probe;
   (d) enabling the indication of said first timer means on-time on a first indicator means;
   (e) causing said indicator means to remain off for an adjustable amount of time equal to the portion of the time said first timer means is caused to remain on due to the effect of the residual capacitance of said probe on said first timer means on-time, and thereafter causing said first indicator means to indicate said first timer means on-time;
   (f) presetting the on-time of a flag timer means;
   (g) strobing said flag timer means at substantially the same time as said first timer means such that it turns on at this time; and
   (h) indicating on a second indicator means when said flag timer on-time is in a specific predetermined condition with respect to the on-time of said first timer means.

7. The method of claim 6 wherein the step of presetting the on-time of a flag timer means comprises the steps of:
   (a) causing the on-time of said flag timer means to be switched to said first indicator means such that said first indicator means indicates said flag timer means on-time;
   (b) adjusting said flag timer means on-time until it matches a desired level of material as represented by said first timer means on-time as indicated on said indicator means; and
   (c) decoupling the on-time of said flag timer means from said first indicator means upon completion of said adjusting.

* * * * *